March 1, 1966

H. W. KOPP 3,237,944

FOOTBALL TRAINING APPARATUS WITH RELEASABLY LATCHED RESILIENT MEMBER

Filed Oct. 17, 1963

INVENTOR.
Harold W. Kopp

BY

Charles S. McGuire
AGENT

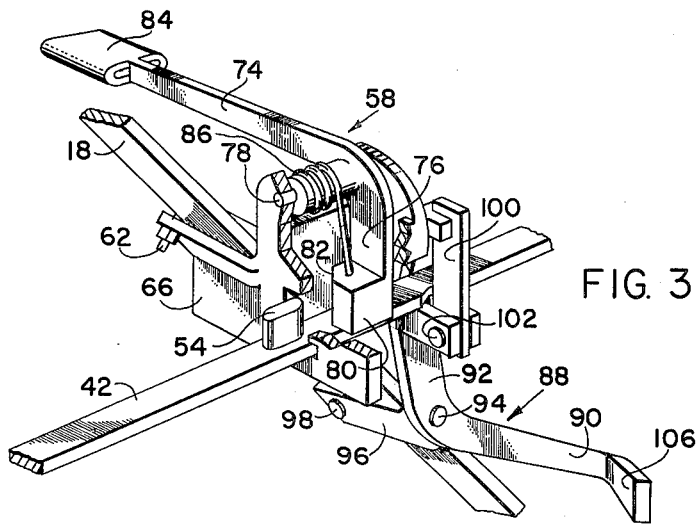
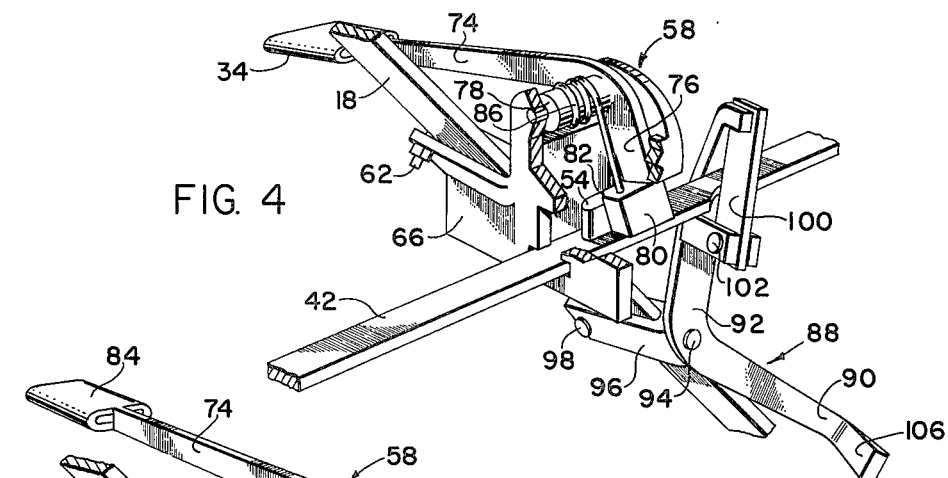
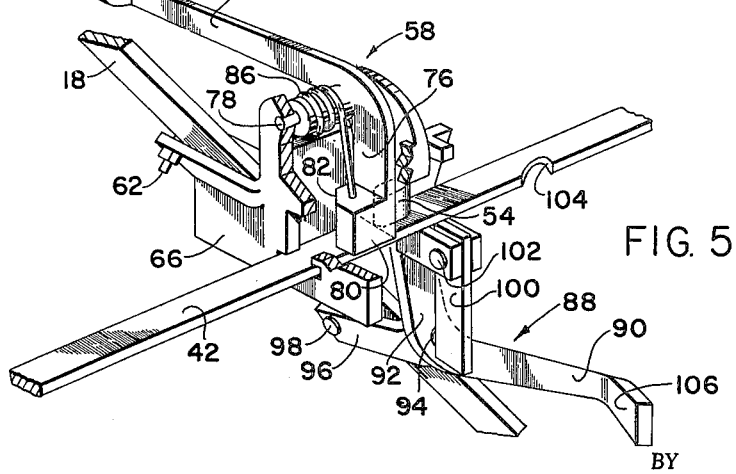

United States Patent Office 3,237,944
Patented Mar. 1, 1966

3,237,944
FOOTBALL TRAINING APPARATUS WITH RELEASABLY LATCHED RESILIENT MEMBER
Harold W. Kopp, Saxonville, Mass., assignor to Halko, Inc., Saxonville, Mass., a corporation of Massachusetts
Filed Oct. 17, 1963, Ser. No. 316,992
4 Claims. (Cl. 273—55)

The present invention relates to improvements in contact apparatus used in developing techniques and reflexes of football players. More specificaly, the invention relates to novel features of a football training machine which provide a sudden forward motion of a resilient member as a visual signal to the training player or players to execute a predetermined movement which may include making contact with, and moving the resilient member to a cocked or latched position.

A number of football training devices, of the type generally known as blocking sleds, include portions intended to be contacted by a training player and moved, either by moving the sled as a whole or the contact portion individually. Some such machines, for example, that shown in my U.S. Patent No. 3,062,547, include swinging contact members which simulate the arm and shoulder movement of an opposing player. Machines of this type are intended primarily as training apparatus for defensive players, the movement of the swinging arm members of the machine corresponding to the movement of an offensive player. Other training machines presently in wide use are provided primarily for the training of offensive players in maneuvers such as blocking. These machines normally include a stationary member with which the training player makes blocking contact upon a verbal signal from a coach or trainer. Both types of machines are well suited for their respective purposes since defensive linemen are trained to move under actual game conditions in response to the visual signal they receive in the form of initial forward movement of an opposing offensive lineman. On the other hand, an offensive lineman is trained to move in response to a predetermined verbal signal, usually given by the quarterback of the offensive team.

The present invention contemplates a novel construction of football training apparatus which may be used to train players to move upon either a visual or a verbal signal; that is, the apparatus may be used equally well to train either offensive or defensive players. Furthermore, a preferred embodiment of the invention may be incorporated with a well-known type of blocking sled presently in wide commercial use to permit such a sled to be used as aforesaid in either offensive or defensive training maneuvers.

The principal structural elements of the training machine include a resilient member in the form of an elongated leaf spring, for example, which provides, or is attached to, the element with which contact is made by the training player. Since the element is resilient it may be moved or distorted from its original position through the contact and force exerted by the player. Latching means are provided for releasably holding the resilient member in some desired position which is other than the normal rest position of the element and to which the resilient element may be moved by the contact and force of the player. The invention provides means for adjusting the amount of force required to move the resilient element from its rest position to that in which it is releasably retained, as well as means for moving the element to the latched or retained position other than by force exerted on the resilient element or other contact member.

Accordingly, it is a principal object of the present invention to provide football training apparatus for contact by a training player which may be used as either a defensive or an offensive reaction-type training machine.

A further object is to provide apparatus which may be easily and quickly combined with well-known football training machines presently in use to increase the versatility and usefulness of such machines.

Another object is to provide a reaction training device including a resilient member which may be retained in an initial position and released for movement directly toward a training player and which may be returned to its initial position by contact and force exerted by such player.

A still further object is to provide football training apparatus including an elongated, resilient spring member which may be latched in an initial position and released therefrom to move towards a training player and having means for adjusting the amount of force required to move the spring member from its rest position to the latched, initial position, as well as means for moving the element to the latched position other than by force exerted directly on the spring member itself.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which wil be indicated in the claims.

For a fuller understanding of the nature and objects of the invention, reference should be had to the following detailed description taken in connection with the accompanying drawings wherein:

FIG. 3 is a fragmentary, perspective view of a portion of the apparatus, showing elements thereof in the uncocked or rest position, certain parts being broken away to allow clearer showing of some elements;

FIG. 4 is a fragmentary, perspective view, as in FIG. 3, showing the elements in an intermediate position of their movement; and FIG. 5 is also a fragmentary perspective view, as in FIGS. 3 and 4, showing the elements in the cocked or latched position.

Figure 1:
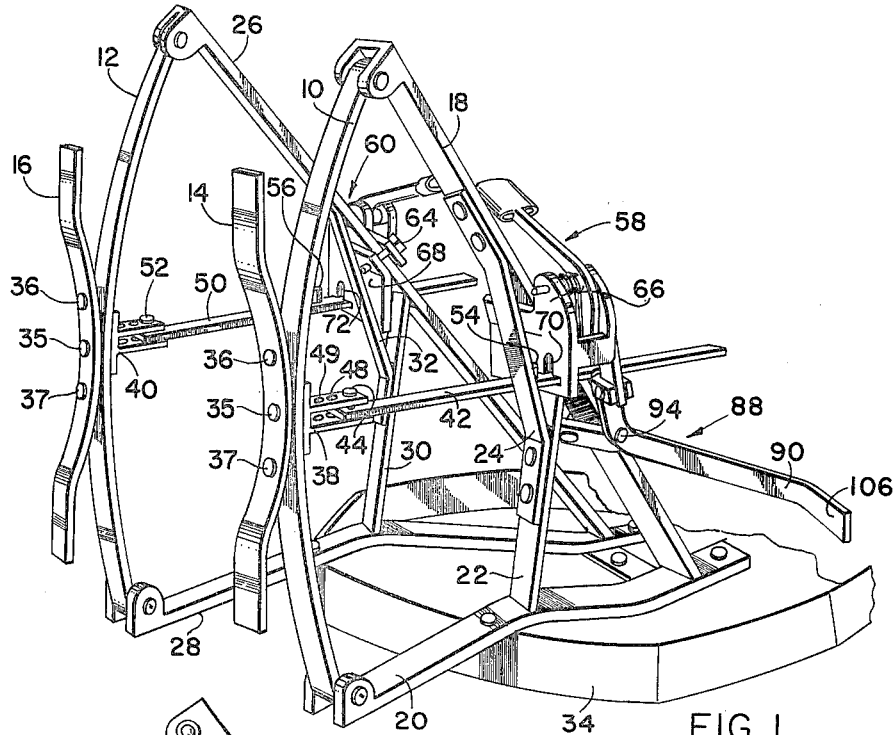
FIGURE 1 is a perspective view of a well-known type of two-man football training machines shown in combination with the apparatus of the present invention.

Referring now to the drawings, in FIGURE 1 is shown a basic type of football training machine generally known as a two-man blocking sled, showing also a preferred embodiment of my novel adapting apparatus attached thereto. The basic machine as previously known comprises, in general, a rigid frame and a pair of vertically disposed, resilient members in the form of long leaf springs. These springs assume a normal rest position and may be flexed, with a tendency to return to their rest position, when forcefully contacted, as by the shoulder of a training player. Such machines are intended primarily as training devices for offensive linemen since the elements of the machine are stationary prior to being contacted by the players. The combination of my modification with the basic machine makes it much more effective for use as a training device for defensive linemen since the resilient elements may then be made to spring forward, in the manner of a blocking offensive lineman, thus providing a life-like, visual signal to the training defensive player.

As seen in FIGURE 1, the basic machine includes a pair of resilient leaf springs 10 and 12 with contact elements 14 and 16 rigidly attached to the forward sides thereof. Padded members (not shown) are commonly attached to the springs or contact elements to represent the opposing players. Spring 10 is attached at its opposite ends to frame members 18 and 20, which may be further reinforced by frame members 22 and 24. Spring 12 is attached in the like manner to frame members 26, 28, 30 and 32. The springs may be attached by any convenient, well-known means to the frame members, which are rigidly attached to one another by bolts, rivets or welding. It is also a common practice to attach the frame members to a suitable base 34 upon which the machine as a whole may slide and/or turn.

Figure 2:
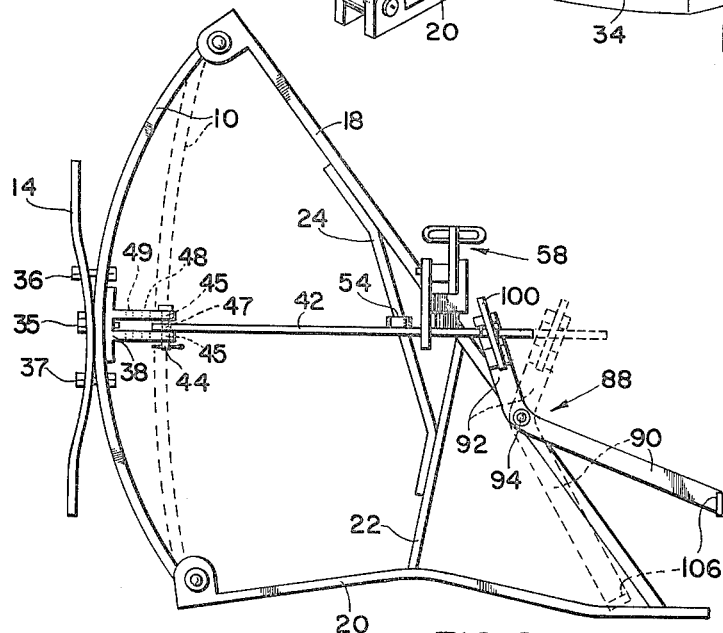
FIG. 2 is a side elevational view of a portion of the apparatus of FIGURE 1, showing in solid lines the rest position, and in dotted lines the cocked or latched position, of the elongated, resilient element.

In many basic football machines such as that shown in FIGURE 1, contact elements 14 and 16 are attached to springs 10 and 12 by a plurality of threaded bolts 35, 36 and 37. As previously mentioned, my adapting apparatus may be readily mounted upon such machines without the necessity of drilling additional holes, welding, or otherwise affecting the basic machine. One of the elements of my apparatus, open U-brackets 38 and 40, may be attached to springs 10 and 12 respectively by removing bolts 35 and replacing them through appropriate openings provided in the U-brackets. The nut may be replaced on bolt 35 on the rear side of the U-brackets to affix them rigidly to the springs or appropriate internal threads may be provided for bolt 35 in the opening in the U-bracket, as shown in FIG. 2. At least one hole is provided in the opposing arms of the U-brackets but, for reasons which will be explained later, a plurality of such holes are preferably provided.

Rigid bar 42 is attached to U-bracket 38 by means of pin 44 which extends loosely through hole 45 in the U-bracket and hole 47 in the bar. Holes 48 and 49 extend through U-bracket 38, horizontally spaced from hole 45. Bar 50 is attached by means of pin 52, to U-bracket 38. Bars 42 and 50 are provided, respectively, with fixed studs 54 and 56 extending from one surface thereof.

Latching apparatus, denoted generally by the numerals 58 and 60, are mounted upon frame members 18 and 26, respectively. The latching apparatus may be conveniently connected to the frame members by providing open brackets on the latching apparatus between which the frame members are engaged. Latching apparatus 58 is secured to frame member 18 by means of bolt 62 (FIGS. 3–5) which extends through the arms of the open bracket, and latching apparatus 60 is secured in like manner, by means of bolt 64 (FIGURE 1), to frame member 26. Latching apparatus 58 and 60 include walls 66 and 68, respectively, wherein are provided inverted-T shaped slots 70 and 72. Bars 42 and 50 are inserted through the lower, horizontal portion of slots 70 and 72, and studs 54 and 56 may pass through the vertical portions. Slots 70 and 72 are of such dimensions that they provide guides for reciprocal horizontal movement of the bars, but are large enough so that the bars and studs may pass freely therethrough.

As best seen in FIGS. 3–5, latching apparatus 58 includes a stationary portion and a movable portion. The stationary portion includes wall 66 and the open bracket which is affixed to frame member 18 by means of bolt 62. The movable portion includes arms 74 and 76 which are rigidly affixed to spindle 78 by means of which the movable portion of the latching apparatus is rotatably mounted upon the stationary portion. Block 80, having forwardly disposed cam surface 82, is affixed to the free end of arm 76, and manually-engageable handle 84 is provided on the free end of arm 74. Spring 86 is provided to bias the movable portion of the latching apparatus in a clockwise direction, as viewed from the front of the machine, about its rotatable mounting.

Springs 10 and 12 are in their unflexed or rest position as seen in FIGURE 1 and also in solid lines in FIG. 2. The elements of latching apparatus 58 and bar 42 are shown in FIG. 3 in their respective positions when spring 10 is in the rest position, stud 54 being positioned forwardly of latching apparatus 58. Due to the resiliency of spring 10 it may be flexed from the rest position shown in solid lines in FIG. 2. When force is applied to contact element 14, as by a shoulder block of a training player, spring 10 is flexed at its center towards the rear of the machine. As spring 10 is flexed in this manner bar 42 is also moved toward the rear, sliding through slot 70 in latching apparatus 58. As stud 54 contacts cam surface 82 of block 80, continued rearward movement of spring 10 and bar 42 causes counterclockwise rotation (as seen from the front) of the movable portion of latching apparatus 58 against the bias of spring 86. As seen in FIG. 4, the elements are in an intermediate position of their movement, spring 10 being partly flexed from its rest position. When stud 54 has been moved past block 80, the bias of spring 86 rotates the movable portion of latching apparatus 58 in a clockwise direction, back to its original position. As seen in FIG. 5, bar 42 is in a rearward position with spring 10 in the position shown in dotted lines in FIG. 2. Stud 54 is urged into engagement with block 80 due to the tendency of spring 10 to return to its rest position.

With the elements in the position of FIG. 5, a coach may grasp handle 84 and rotate arms 74 and 76 in a counterclockwise direction, thus moving block 80 out of the path of movement of stud 54. Spring 10 may then return to its rest position, moving from the position shown in dotted lines to that shown in solid lines in FIG. 2. Since spring 10 is relatively strong the natural bias thereof when in the flexed position causes rapid movement of the spring, and thus of contact element 14, towards a training player positioned forwardly of the machine. This sudden forward movement, simulating that of an offensive lineman when the ball is put in play, provides a life-like, visual signal to the defensive player to execute his defensive assignment, which may include making forceful, bodily contact with contact element 14 or a padded member or the like attached thereto. If member 14 is contacted with sufficient force, spring 10 may be flexed by such an amount that stud 54 will be forced past block 80 and the elements will again be retained in the latched position of FIG. 5. Thus, it is possible with the present invention to provide an indication of the degree of force applied by a player in contacting the machine.

In addition to the elements heretofore described, a preferred embodiment of the invention includes means for moving the elements from the rest to the latched position without applying force directly to contact element 14 or spring 10 from the forward side thereof. Such means are illustrated in the form of a rotatable lever which is releasably engageable with a portion of bar 42. Lever 88 includes arms 90 and 92 which are pivotally mounted at their juncture by means of bolt 94 upon U-bracket 96. The lever is secured to the frame of the machine by engaging frame member 18 between the arms of U-bracket 96 and tightening bolt 98. Arm 92 is provided with movable member 100 which is rotatably mounted by means of bolt 102 with respect to the remainder of lever 88. Notch 104 (FIG. 5) is provided in bar 42 and member 100 may be moved between engaged (FIGS. 3 and 4) and disengaged (FIG. 5) positions with respect to the notch. With the apparatus in the rest position of FIG. 3 and member 100 engaged in notch 106, it may be seen that rotation of lever 88 in a clockwise direction will move bar 42 toward the rear. Spring 10 will thus be flexed away from the rest position. Continued rotation of lever 88 will move the elements through the position of FIG. 4 to that of FIG. 5, wherein the apparatus is again held in the latched position as previously explained. Projection 106 is provided on the free end of arm 90 in such a position that it may conveniently be engaged by the foot of the coach or trainer who is operating the apparatus. The movement of lever 88 in moving the apparatus from the rest to the latched position may be seen in solid and dotted lines, respectively, in FIG. 2.

As soon as the apparatus has been moved to the latched position, member 100 is preferably disengaged from notch 104, as shown in FIG. 5. Otherwise, release of the latching apparatus would cause sudden, forceful counter-rotation of lever 88. Consequently, appropriate spring biasing means (not shown) may be provided for moving member 100 to the disengaged position. Likewise, lever 88 may be biased toward the forward position, shown in FIG. 5, if desired.

The provision of a plurality of holes 45, 48 and 49 in U-bracket 38 allows the amount of force required to move spring 10 to its flexed or latched position to be adjusted. The distance which stud 54 must be moved from its position of FIG. 3 to that of FIG. 5 determines the amount by which spring 10 is flexed when moved from the rest to the latched position. Securing bar 42 to U-bracket 38 by inserting pin 44 through holes 45 and 47, as shown in FIGS. 1 and 2, requires that stud 54 be moved a shorter distance to the latched position than would be the case if the pin were inserted through holes 48 and 47, for example. Insertion of pin 44 through holes 49 and 47 would require an even greater movement of stud 54, and thus of spring 10, in order to latch the elements in the position of FIG. 5. Such a provision is desirable since the tension in spring 10 may decrease after repeated use, and also since the apparatus may be used for training players of different age or proficiency levels without requiring modification of the apparatus.

The foregoing description of elements associated with spring 10 and contact element 14 apply also to the elements associated with spring 12 and contact element 16. That is, latching apparatus 60 is similar to latching apparatus 58 and a second cocking lever (not shown), similar to cocking lever 88, may also be provided in association with bar 50 if desired. Although the apparatus of the invention has been described in connection with a training machine generally used by two players simultaneously, it is obvious that it could be incorporated in a machine having only one, or more than two, resilient members such as springs 10 and 12. In the illustrated embodiment, the handles of latching apparatus 58 and 60 are both turned inwardly, so that the two are constructed oppositely, i.e., in right-hand and left-hand manner, respectively, but this construction is not essential.

It is thus evident from the foregoing description that the present invention provides football training apparatus which is versatile as well as rugged and relatively simple in operation and construction. The feature of the machine which permits sudden movement, under the control of the coach, of the member with which contact is to be made toward the training player is especially useful in the training of defensive players. Thus, the defensive player is trained to move in response to movement of the opposing offensive player. Also, it is again noted that training machines presently in wide use may be modified according to the present invention very quickly and simply without requiring additional machining operations or other physical or structural changes in the basic apparatus.

Since certain changes may be made in the above apparatus without departing from the scope of the invention herein involved, it is intended that all matter contained in the above description or shown in the accompanying drawings shall be interpreted as illustrative and not in a limiting sense.

Having thus described the invention in such manner that it may be practiced by those skilled in the art, what is claimed as new and desired to be secured by U.S. Letters Patent is:

1. In football training apparatus having at least one elongated, resilient member secured at each of its ends to a frame and adapted to be flexed from its rest position by contact of a training player with said apparatus, the combination comprising:
 (a) a rigid member connected to said resilient member for movement therewith;
 (b) retaining means for releasably fixing said rigid member, and thereby said resilient member, in a first position wherein said resilient member is flexed from said rest position; and
 (c) means for manually releasing said retaining means, whereby said resilient member moves from said first position to said rest position.

2. In football training apparatus having at least one vertically disposed, elongated leaf spring which is secured to a frame and adapted to be resiliently flexed from its rest position by forceful contact of a training player with said apparatus, the combination comprising:
 (a) a rigid bar;
 (b) means attaching said bar to said spring for longitudinal movement in response to flexing movement of said spring;
 (c) latching means cooperable with said bar for releasably retaining said bar, and thereby said spring, in a latched position when said spring is moved from said rest position to a first flexed position; and
 (d) manually engageable means for moving said latching means to an unlatched position, whereby the natural bias of said spring causes it to move from said first flexed position to said rest position.

3. In football training apparatus having a vertical, forwardly-disposed, elongated leaf spring adapted to provide resilient opposing force to a training player making contact with said apparatus, the combination comprising:
 (a) a frame to which said spring is secured in a rest position;
 (b) a rigid member attached to said spring for movement therewith relative to said frame as said spring moves between said rest position and a flexed position, wherein the natural bias of said spring tends to return it to said rest position;
 (c) latching means movable to an engaged position with respect to said rigid member and said frame to prevent relative movement of the two in a first direction when said spring has been moved to said flexed position, said first direction being the direction of movement of said rigid member when said spring moves from said flexed to said rest position; and
 (d) means for manually moving said latching means to a disengaged position, thereby permitting movement of said rigid member relative to said frame and allowing said spring to return, under its natural bias, to said rest position.

4. The invention according to claim 3 wherein said latching means is fixedly mounted upon said frame and includes a movable engagement portion.

References Cited by the Examiner
UNITED STATES PATENTS

| | | | |
|---|---|---|---|
| 1,182,530 | 5/1916 | Doane | 273—69 |
| 2,820,365 | 1/1958 | Detzel | 273—69 |
| 3,144,251 | 8/1964 | Gainey et al. | 273—55 |

DELBERT B. LOWE, *Primary Examiner.*

G. L. PRICE, *Assistant Examiner.*